United States Patent
Witt et al.

(10) Patent No.: US 6,856,437 B2
(45) Date of Patent: Feb. 15, 2005

(54) FAST STEERING MIRROR

(75) Inventors: John D. Witt, Seattle, WA (US); Tyler M. Anderson, Kent, WA (US)

(73) Assignee: Terabeam Corporation, Kirkland, WA (US)

( * ) Notice: Subject to any disclaimer, the term of this patent is extended or adjusted under 35 U.S.C. 154(b) by 375 days.

(21) Appl. No.: 10/061,557

(22) Filed: Feb. 1, 2002

(65) Prior Publication Data

US 2003/0197910 A1 Oct. 23, 2003

(51) Int. Cl.⁷ ............................................... G02B 26/08
(52) U.S. Cl. ..................... 359/198; 359/872; 248/477; 248/479
(58) Field of Search .................................. 359/109, 152, 359/154, 159, 198, 197, 199, 822, 871, 872, 876, 877; 248/476, 477, 479, 485

(56) References Cited

U.S. PATENT DOCUMENTS 5,110,195 A * 5/1992 Loney ........................ 359/224
6,268,944 B1  7/2001 Szapiel
6,327,065 B1 * 12/2001 Danial et al. ................ 359/198
6,411,447 B1 * 6/2002 Hilbert ........................ 359/822

* cited by examiner

Primary Examiner—Euncha Cherry
(74) Attorney, Agent, or Firm—Blakely, Sokoloff, Taylor & Zafman LLP

(57) ABSTRACT

A fast steering mirror for use in free space optical communication systems. The fast steering mirror includes a gimbaled movement comprising an outer gimbal pivotally coupled to a base member and an inner gimbal pivotally coupled to the outer gimbal. A mirror that is posited by the apparatus is coupled to the inner gimbal. A first pair of voice coil drivers including a pair of magnetized stators fixedly coupled to the base member and a pair of voice coils fixedly coupled to the outer gimbal are provided along with a second pair of voice coil drivers comprising a pair of magnetized stators coupled to the base member and a pair of voice coils coupled to the inner gimbal. Selectable drive currents may be provided to the windings in the voice coils to position the mirror. In one embodiment, the fast steering mirror further includes a reference position seek mechanism.

27 Claims, 16 Drawing Sheets

FAST STEERING MIRROR

TECHNICAL FIELD

The present invention relates generally to optical communication systems, and in particular, to a fast steering mirror for use in free-space optical communication systems.

BACKGROUND

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunication systems, also known as "free-space optical" (FSO) communication systems, utilize beams of light, such as lasers, as optical communications signals, and therefore do not require the routing of cables or fibers between locations. Data or information is encoded into a beam of light, and then transmitted through free space from a transmitter to a receiver.

For point-to-point free space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at each other. For example, a transmitted optical beam with a 1-mrad divergence has a spot diameter at the receiver of about 1 meter at a 1-km range. Thus, movement of the transmitter or receiver by even a small fraction of the divergence (or field-of-view) could compromise the link unless active tracking is employed. Since high-speed communication channels utilize extremely sensitive detectors, such systems require equally sensitive tracking systems.

Charge coupled device (CCD) arrays or quadrant cell optical detectors (sometimes referred to as "quad cells") may be used as tracking detectors in a tracking system. In either case, an electrically controllable steering mirror, gimbal, or other steering device may be used to maximize an optical signal (e.g., light) directed at a high-speed detector, based on information provided by the tracking detector. This is possible since optical paths for tracking and communication are pre-aligned, and the nature of a tracking signal for a perfectly aligned system is known.

A schematic diagram corresponding to a typical optic position correction control loop used in a FSO transceiver 310 is illustrated in FIG. 1. The objective of the control loop is to control the position of a fast steering mirror 312 such that a maximum optical signal is received by a receive path 313. In the illustrated configuration, incoming light comprising a received optical signal 314 is received by a telescope 316 including a plurality of lenses (not shown), which collimates the optical signal into a collimated beam 318. The collimated beam is directed toward fast steering mirror 312, which redirects the light toward a beam splitter 320. The beam splitter directs a majority (e.g., 80–90%) of the beam's energy toward a lens 322 that converges the light toward its focal point, which coincides with receive path 312, whereupon the received signal is processed by a signal processing block 324 to generate data 326. A remaining portion (e.g., 10–20%) of the beam's energy passes through the beam splitter and is received at lens 328, which focuses the light toward a beam position sensor 330 that is located coincident to the lens' focal point. Generally, the beam position sensor may comprise a quad cell, CCD (charge-coupled device), electronic camera, or any other sensor that is capable of detecting the position of a light beam. The beam position sensor generates an two-axis position error signal (or position data from which an error signal can be derived), which is received by a position controller 332. The position controller processes the two-axis position error signal or position data to generate a two-axis torque command signal that is used to drive a two-axis mirror driver 334 coupled to the fast steering mirror. Based on the beam position sensor's output, the closed loop control system drives the position of the fast steering mirror such that the optical signal is directed toward beam splitter 320 in an manner that optimizes the optical signal received by receive path 313 using conventional closed-loop feedback, which typically is used to position either the entire FSO transceiver or optical components included therein, such as steering mirror 312.

In order to maintain an optimal signal received by the receive path, it is necessary that the fast steering mirror be able to compensate for various mechanical disturbances imposed on the FSO transceiver, such as building movement and vibrations. Preferably, the bandwidth of the fast steering mirror positioner should be 5–10 times greater than that of the mechanical disturbances.

SUMMARY OF THE INVENTION

The present invention concerns a fast steering mirror for use in free space optical communication systems that provides significant performance enhancements and cost reductions when compared with existing fast steering mirrors. The fast steering mirror includes a gimbaled movement comprising an outer gimbal pivotally coupled to a base member and an inner gimbal pivotally coupled to the outer gimbal. A mirror that is posited by the fast steering mirror apparatus is coupled to the inner gimbal. A first pair of voice coil drivers including a pair of magnetized stators fixedly coupled to the base member and a pair of voice coils fixedly coupled to the outer gimbal are provided to enable the mirror to be pivoted about a first pivot axis X through rotation of the inner gimbal relative to the outer gimbal in response to selectable drive currents provided to the windings in the inner gimbal voice coils. Likewise, a second pair of voice coil drivers comprising a pair of magnetized stators coupled to the base member and a pair of voice coils coupled to the outer gimbal enable the outer gimbal to be rotated relative to the base member in response to selectable drive currents provided to the windings in the outer gimbal voice coils.

In accordance with other aspects of the invention, control systems are provided for positioning the fast steering mirror. In one embodiment, the fast steering mirror further includes a reference position seek mechanism and a reference position control system that enables the fast steering mirror to be positioned to a known position.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 12A and 12B are cross-section views of a voice coil/voice coil stator pair, including magnetic flux lines generated by applying current to the windings of the voice coils, wherein FIG. 12A illustrates an attractive or pull force that results when the flux lines are in opposite directions and FIG. 12B illustrates a repulsive or push force that results when the flux lines are in the same direction; and FIGS. 13A–D illustrate the effects of rotations about orthogonal X and Y pivot axes due to corresponding drive currents, wherein FIG. 13A shows the fast steering mirror in a neutral position (e.g. a reference position), FIG. 13B shows the fast steering mirror rotated about pivot axis X, FIG. 13C shows the fast steering mirror rotated about pivot axis Y, and FIG. 13D shows a complex rotation of the fast steering mirror about both the X and Y pivot axes.

DETAILED DESCRIPTION OF THE ILLUSTRATED EMBODIMENTS

Embodiments of a system and method for tracking in an optical wireless communication system are described herein. In the following description, some specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
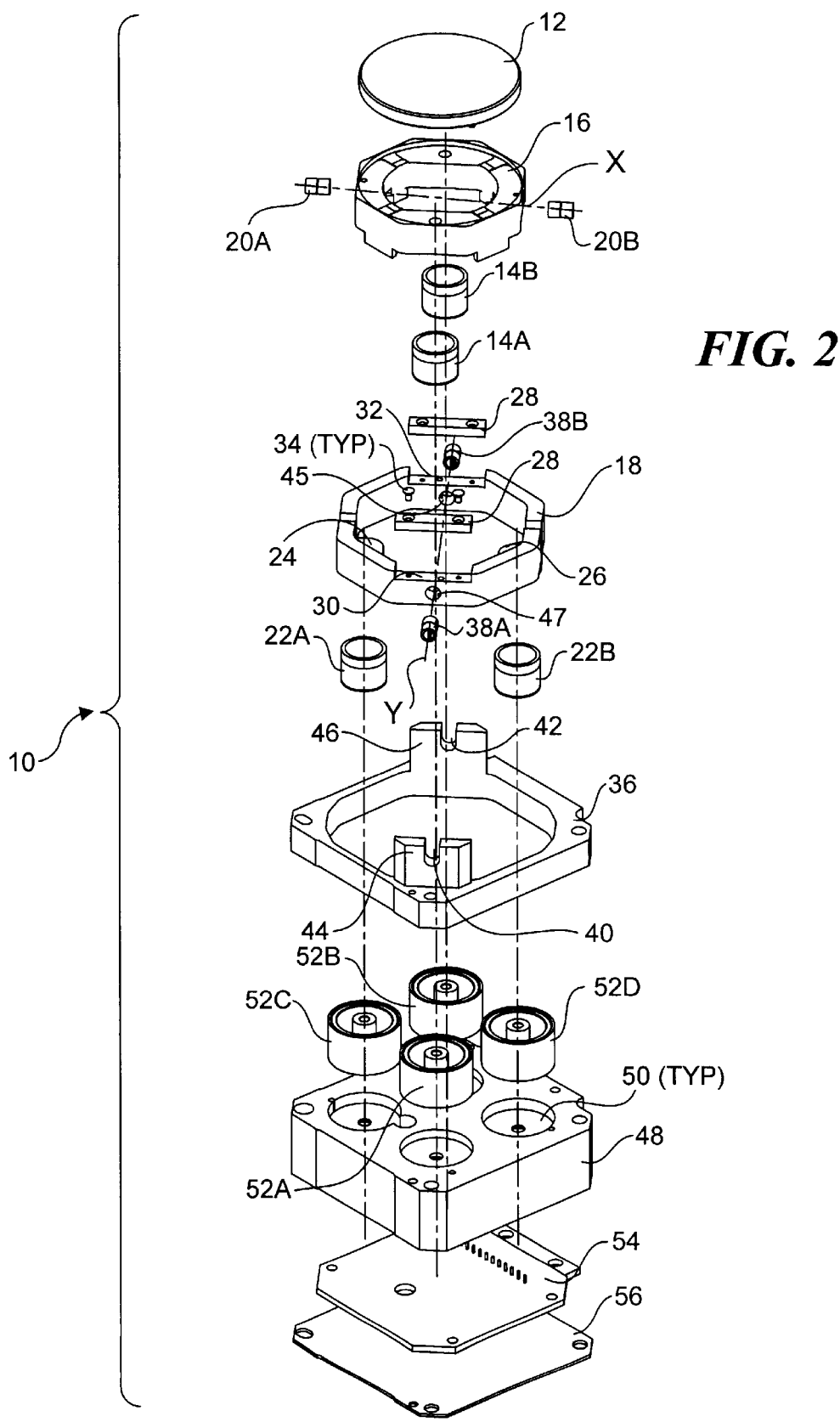
FIG. 2 is an exploded isometric view of a fast steering mirror in accordance with a first embodiment of the invention.

An exploded isometric view illustrating a fast steering mirror 10 in accordance with a first embodiment of the invention is shown in FIG. 2. Fast steering mirror 10 includes a mirror 12 and a first pair of voice coils 14A and 14B that are mounted to an inner gimbal frame 16. The inner gimbal frame is pivotally coupled to an outer gimbal frame 18 via a first pair of flex pivots 20A and 20B, forming a first pivot axis X. A second pair of voice coils 22A and 22B are mounted to the underside of outer gimbal frame 18 via respective mounting pads 24 and 26, as well as a pair of counterweights 28, which are mounted within respective cutouts 30 and 32 using fasteners 34. Outer gimbal frame 18 is pivotally coupled to a gimbal support frame 36 via a second pair of flex pivots 38A and 38B to form a second pivot axis Y that is orthogonal to first pivot axis X. Respective flex pivots 38A and 38B include one end that is received by slots 40 and 42 defined in upright extensions 44 and 46 and secured with a structural adhesive, while their other ends are respectively inserted into holes 45 and 47 defined in outer gimbal frame 18 and secured with a structural adhesive.

Gimbal support frame 36 is fixedly secured to a base 48 via a plurality of fasteners (not shown). Base 48 includes a plurality of counterbores 50 in which respective voice coil stators 52A, 52B, 52C and 52D are disposed. In one embodiment, fast steering mirror 10 further includes a voice coil driver printed circuit board (PCB) 54 that is mounted within a recess in the underside of base 48. In one embodiment, the voice coil driver PCB is covered with a cover 56 that is secured over the recess using a plurality of fasteners (not shown) that are threaded into the underside of base 48.

Figure 3A:
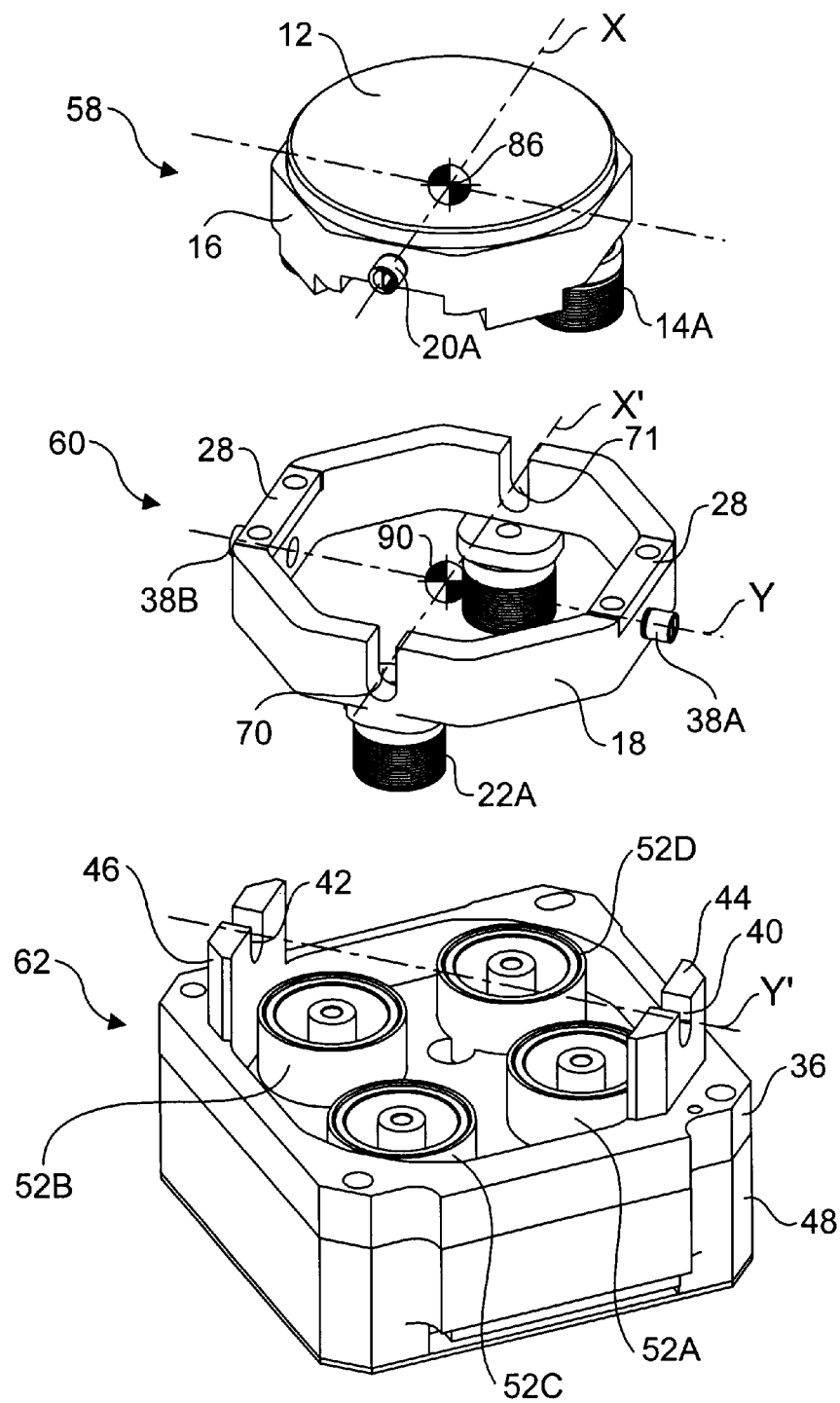
FIG. 3A is a topside isometric exploded view of the three subassemblies of the fast steering mirror of FIG. 1.
Figure 3B:
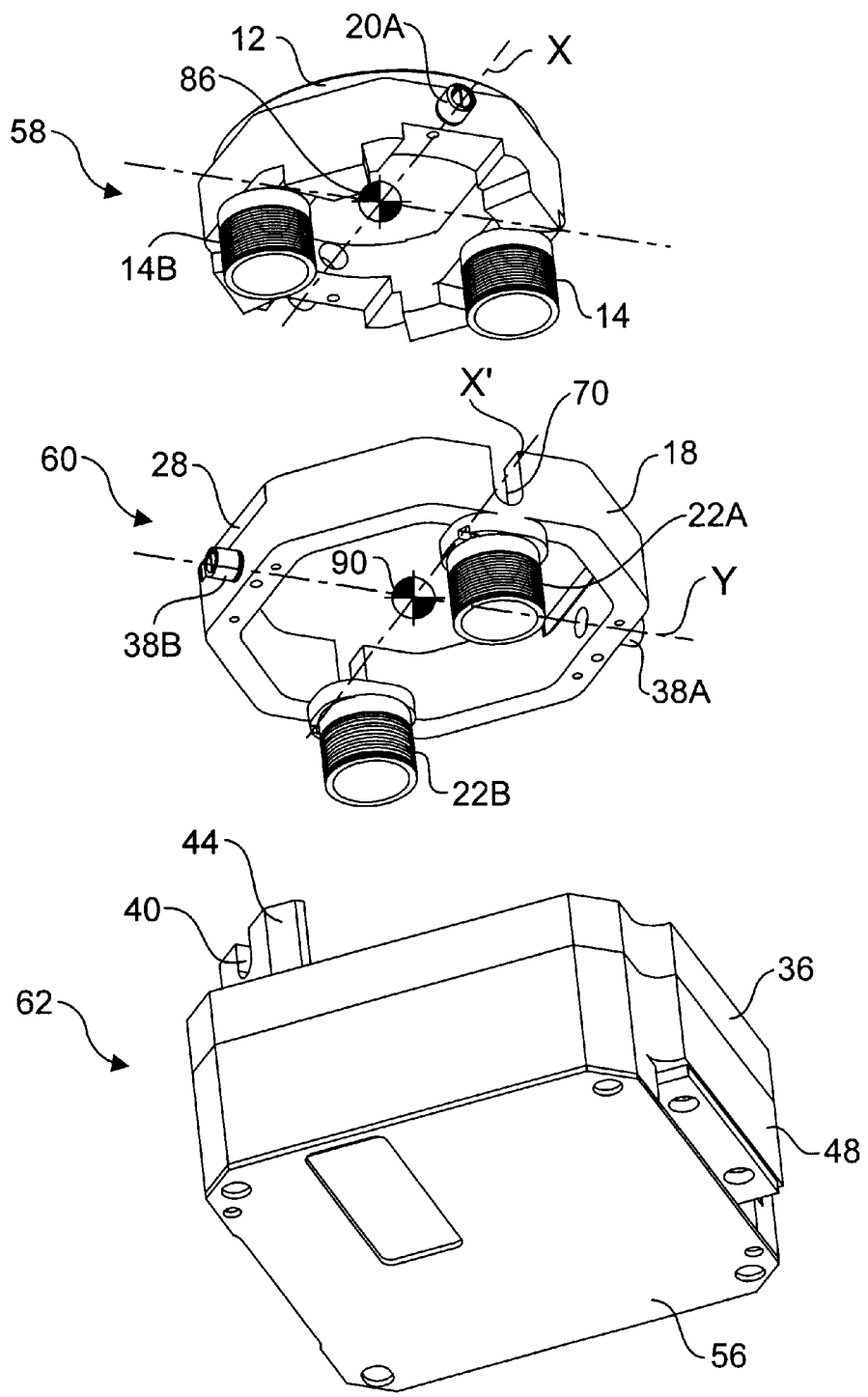
FIG. 3B is an underside isometric exploded view of the three subassemblies of the fast steering mirror of FIG. 1.
Figure 4A:
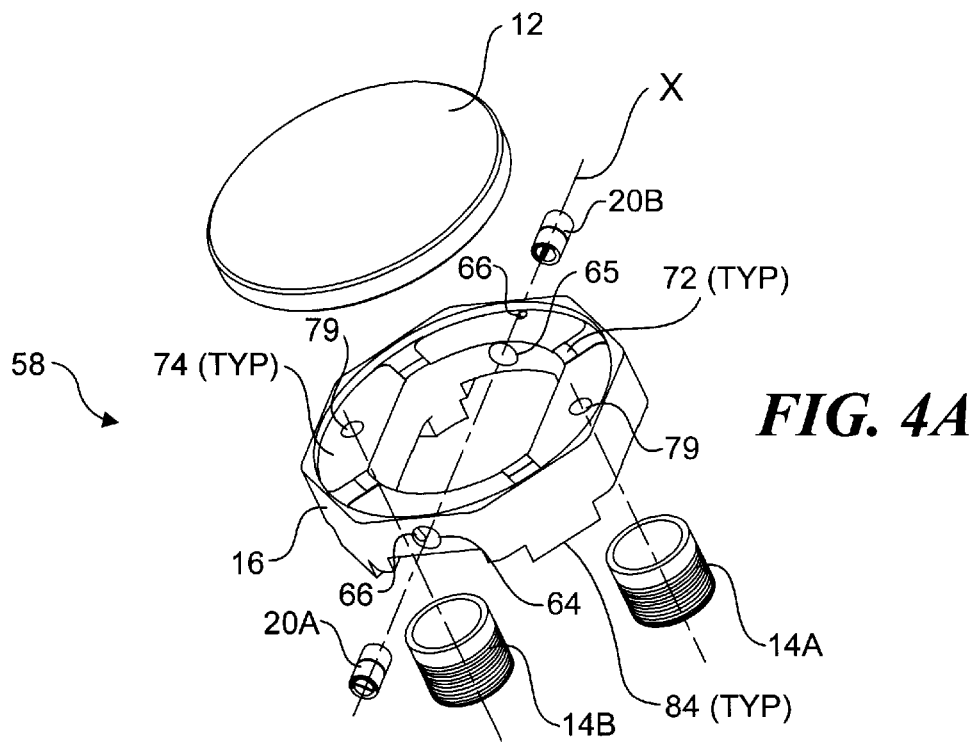
FIGS. 4A and 4B are isometric exploded views of the inner gimbal assembly of FIG. 3.
Figure 4B:
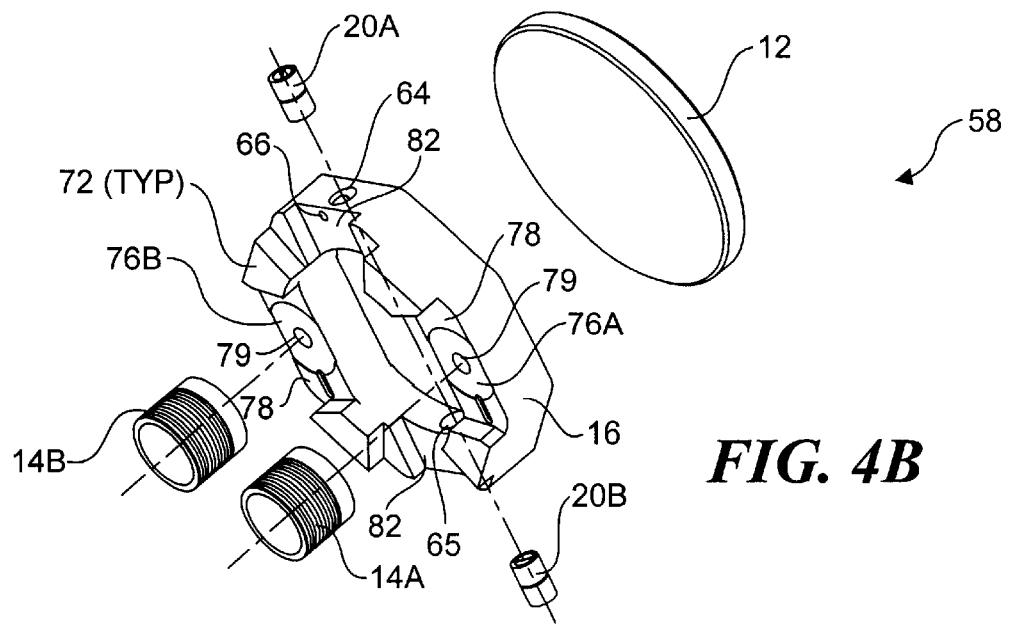
Figure 5A:
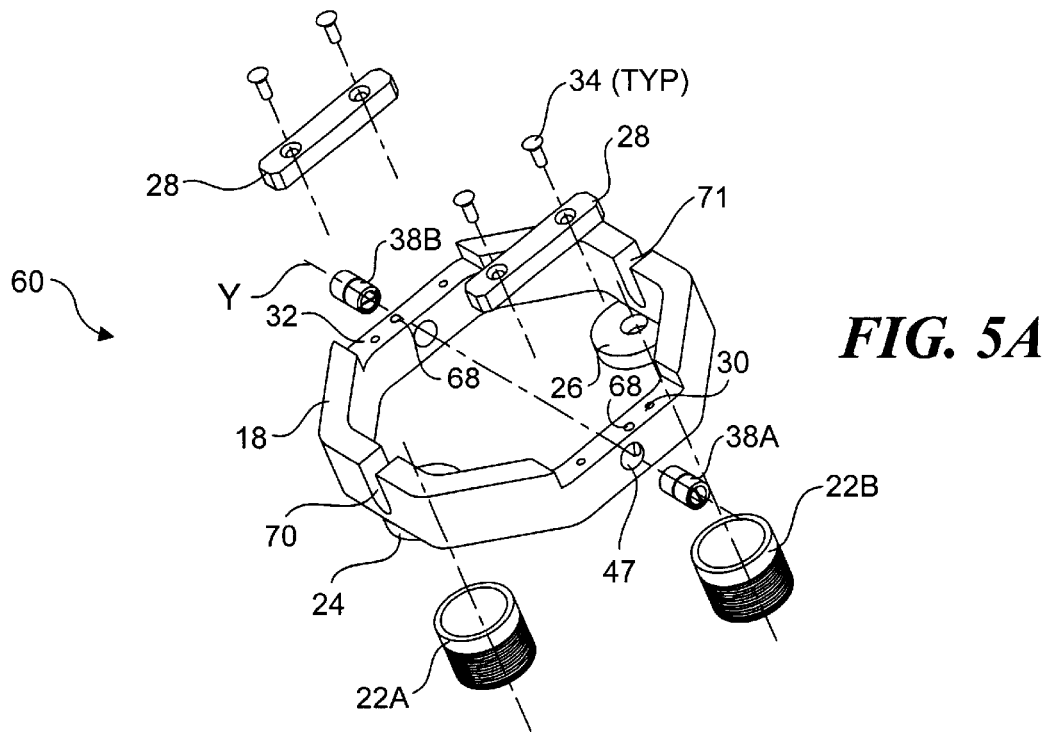
FIGS. 5A and 5B are isometric exploded views of the outer gimbal assembly of the fast steering mirror of FIG. 1.
Figure 5B:
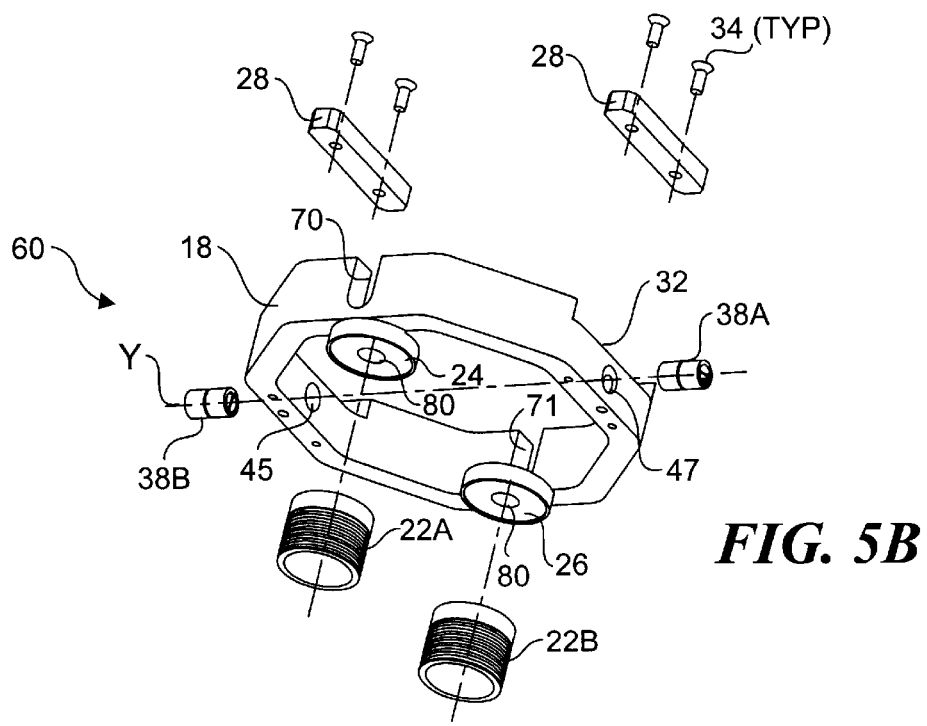

At a subassembly level, fast steering mirror 10 includes three subassemblies, including a inner gimbal assembly 58, an outer gimbal assembly 60, and a base assembly 62, as shown in FIGS. 3A and 3B. With reference to FIGS. 4A and 4B, upon assembly of inner gimbal assembly one end of respective flex pivots 20A and 20B are inserted into a pair of collinear holes 64 and 65 defined in inner gimbal frame 16 and secured with a structural adhesive that is inserted into adhesive insertion holes 66, while the other ends are received by collinear slots 70 and 71 defined in opposing sides of outer gimbal 18 and secured with a structural adhesive. With reference to FIGS. 5A and 5B, similar adhesive insertion holes 68 are defined in outer gimbal frame 18 to allow adhesive to be inserted into holes 45 and 47 to secure one end of flex pivots 38A and 38B, respectively.

Returning to FIGS. 4A and 4B, a plurality of mounting pads 72 adapted to receive mirror 12 are disposed on the top side of inner gimbal frame 16, while a structural adhesive is inserted into shallow cutouts 74 to secure mirror 12 to the inner gimbal frame. Voice coils 14A and 14B are secured to respective mounting pads 76A and 76B that are centrally disposed within a pair of cutouts 78 using a structural adhesive. A pair of optional alignment holes 79 passing through a central portion of mounting pads 76A and 76B may be provided to assist in positioning the voice coils during assembly of inner gimbal assembly 58. Similarly, a pair of optional alignment holes 80 may be defined to pass through a central portion of mounting pads 24 and 26 to assist in aligning voice coils 22A and 22B during assembly of the voice coils to the mounting pads, as shown in FIGS. 5A and 5B. Inner gimbal frame 16 further includes a pair of cutouts 82 to provide clearance for mounting pads 24 and 26 of outer gimbal frame 18 upon rotation of the inner gimbal frame relative to the outer gimbal frame.

Both the inner and outer gimbal assemblies includes features to make them balanced such that the center of gravity of each gimbal assembly is substantially coincident with its respective axis of rotation upon assembly of its components. For example, inner gimbal frame 16 includes a plurality of extensions 84 that extend downward and are equally spaced to lower the center of gravity 86 of the combination of inner gimbal frame 16, mirror 12, flex pivots 20A, 20B and voice coils 14A and 14B such that it is coincident with first pivot axis X. In the case of outer gimbal assembly 60, counterweights 28 are disposed within respective cutouts 30 and 32 formed in the top side of outer gimbal frame 18 to raise the center of gravity 90 of the combination of the outer gimbal frame, counterweights, flex pivots 38A, 38B, and voice coils 22A and 22B such that it is coincident with second pivot access Y. In one embodiment, each of counterweights 28 is secured by a pair of fasteners 34.

Figure 6:
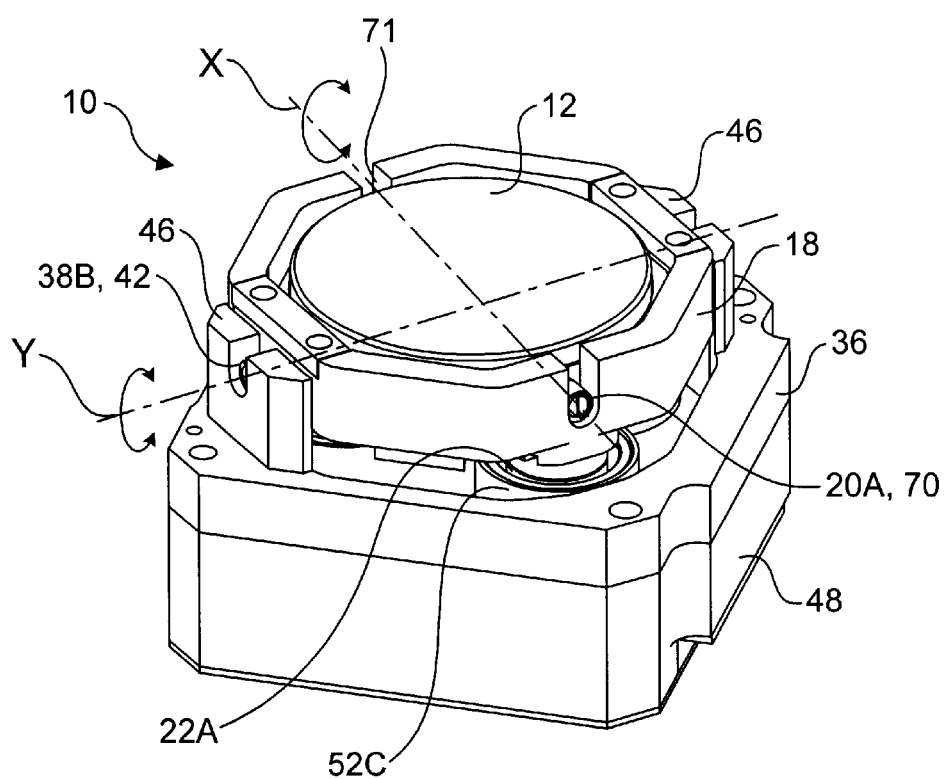
FIG. 6 is an isometric assembled view corresponding to the fast steering mirror of FIG. 1.

An isometric view of an assembled fast steering mirror 10 is shown in FIG. 6. Upon assembly, first pivot axis X is aligned with an axis X' corresponding to the centerline of slots 70 and 71 in outer gimbal frame 18, while second pivot axis Y is aligned with an axis Y' corresponding to the centerline of slots 40 and 42 defined in respective upright extensions 44 and 46. In a preferred embodiment, first pivot axis X and second pivot Y are configured such that they are orthogonal and intersect each other. As a result, a rotation about one pivot access doesn't cause an offset about the other. Since each of inner gimbal assembly 58 and outer gimbal assembly 60 are balanced about their respective axis of rotation, the orientation of the fast steering mirror is substantially irrelevant to the performance of the apparatus. Furthermore, each of the inner and outer gimbal assemblies are configured to have a reduced mass and a reduced polar moment of inertia when compared with conventional fast steering mirror assemblies.

Upon assembly, each of voice coils 14A, 14B, 22A and 22B is disposed within a central portion of corresponding voice coil stator (voice coil stators 52A, 52B, 52C, and 52D, respectively). As explained in further detail below, selective electrical currents are supplied to the windings of the voice coils to generate controllable forces in each voice coil/voice coil stator pair to produce desired rotations of mirror 112 about the X and Y pivot axes using a closed-loop control system. In one embodiment, selected currents are supplied to the voice coils via a pair of flex circuits, in a manner similar to that shown in FIGS. 7A and 7B. Upon assembly, one end of each of the flex circuits is connected to PCB 54 and driven by drive circuitry mounted to the PCB. Optionally, flexible wires may be used to supply currents to the voice coil windings.

Figure 7A:
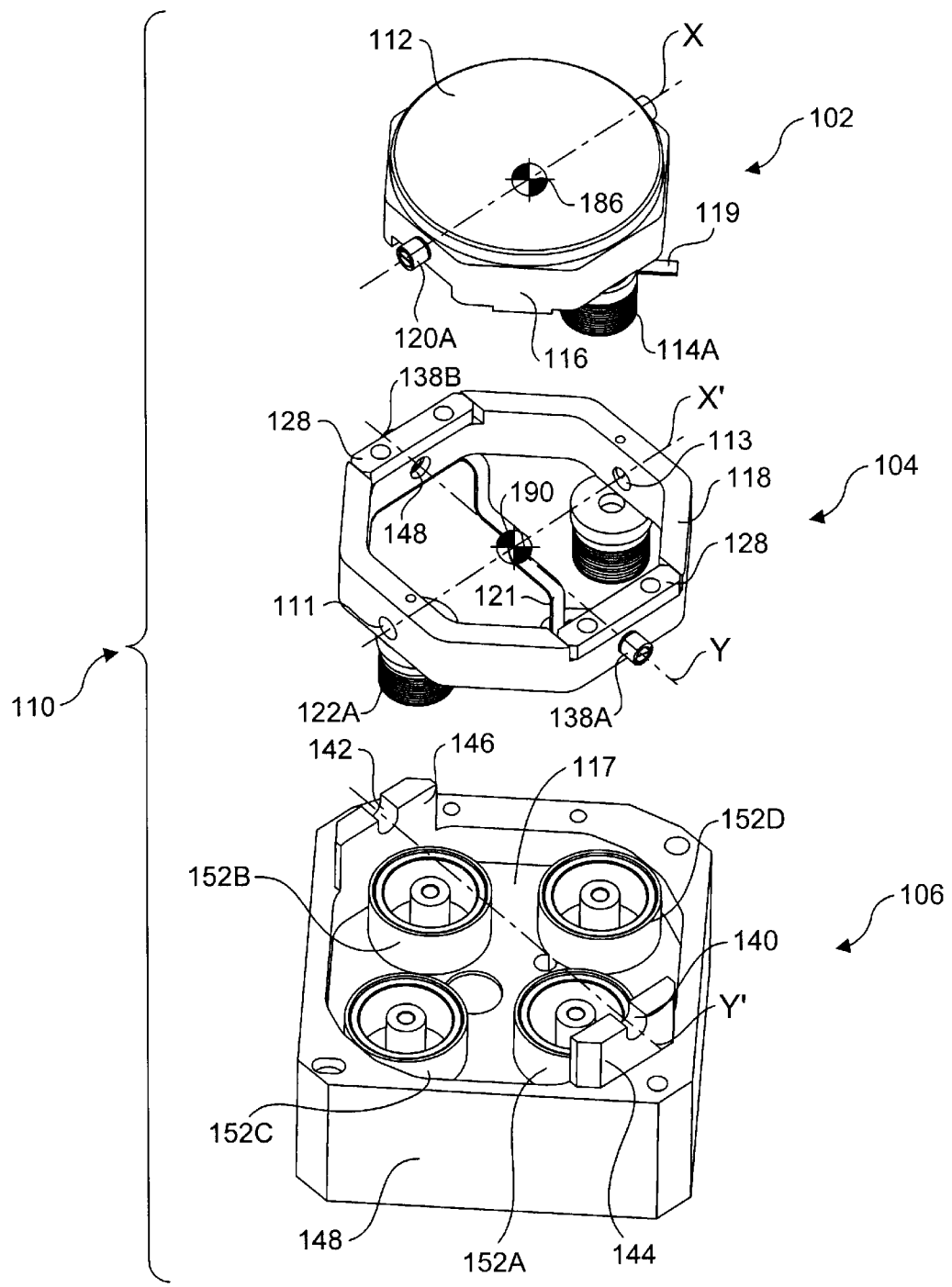
FIG. 7A is a topside isometric exploded view of the three subassemblies of a fast steering mirror in accordance with a second embodiment of the invention.
Figure 7B:
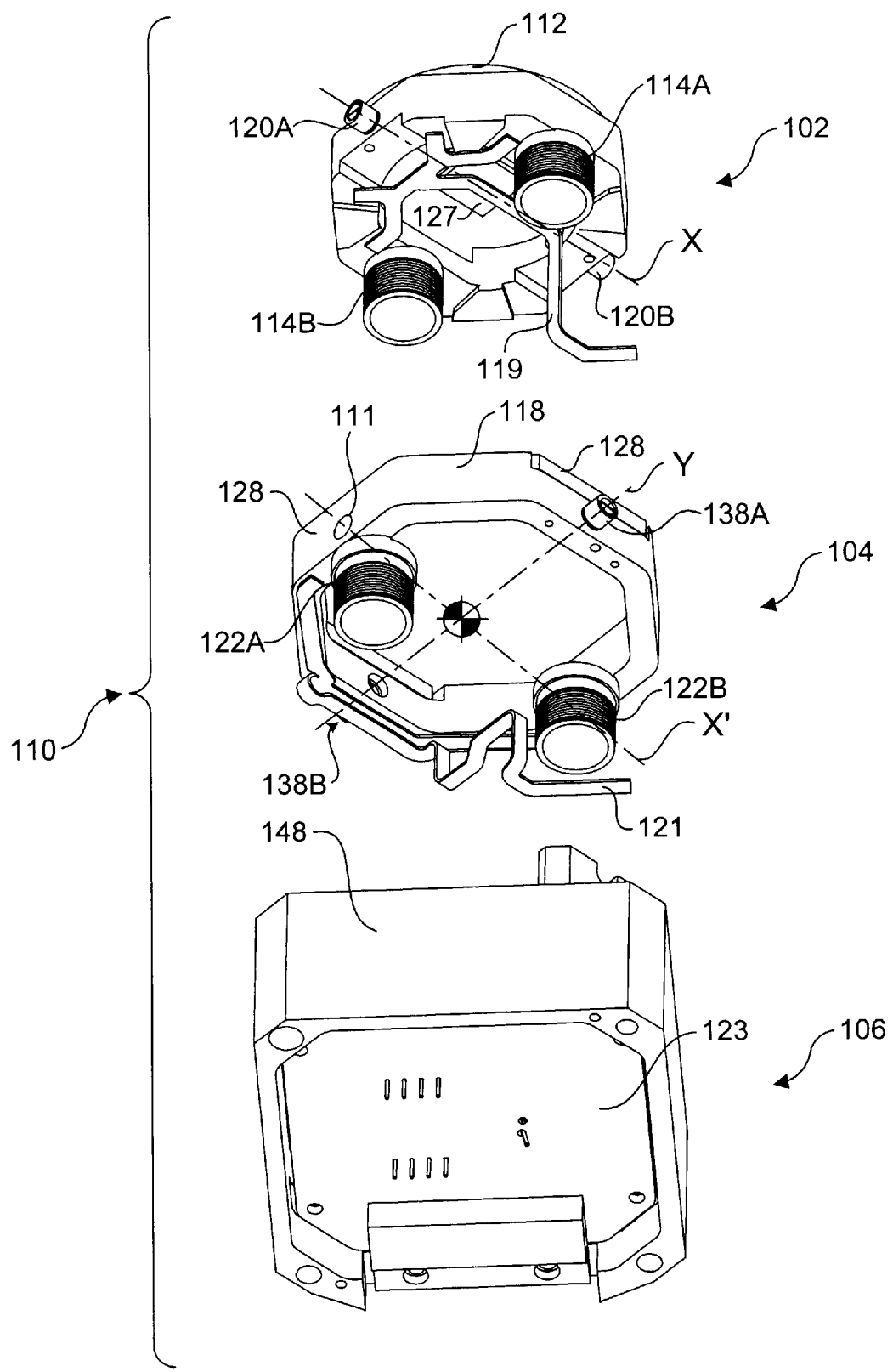
FIG. 7B is an underside isometric exploded view of the three subassemblies of FIG. 7A.

An exploded isometric subassembly view illustrating a fast steering mirror 110 in accordance with a second embodiment of the invention is shown in FIGS. 7A and 7B. Many of the components in fast steering mirror 110 perform substantially similar functions to corresponding components in fast steering mirror 10; the reference numbers for these components share the last two digits in both embodiments. For example, fast steering mirror 10 includes a mirror 12 mounted to an inner gimbal frame 16, while fast steering mirror 110 includes a mirror 112 mounted to an inner gimbal frame 116.

Figure 8:
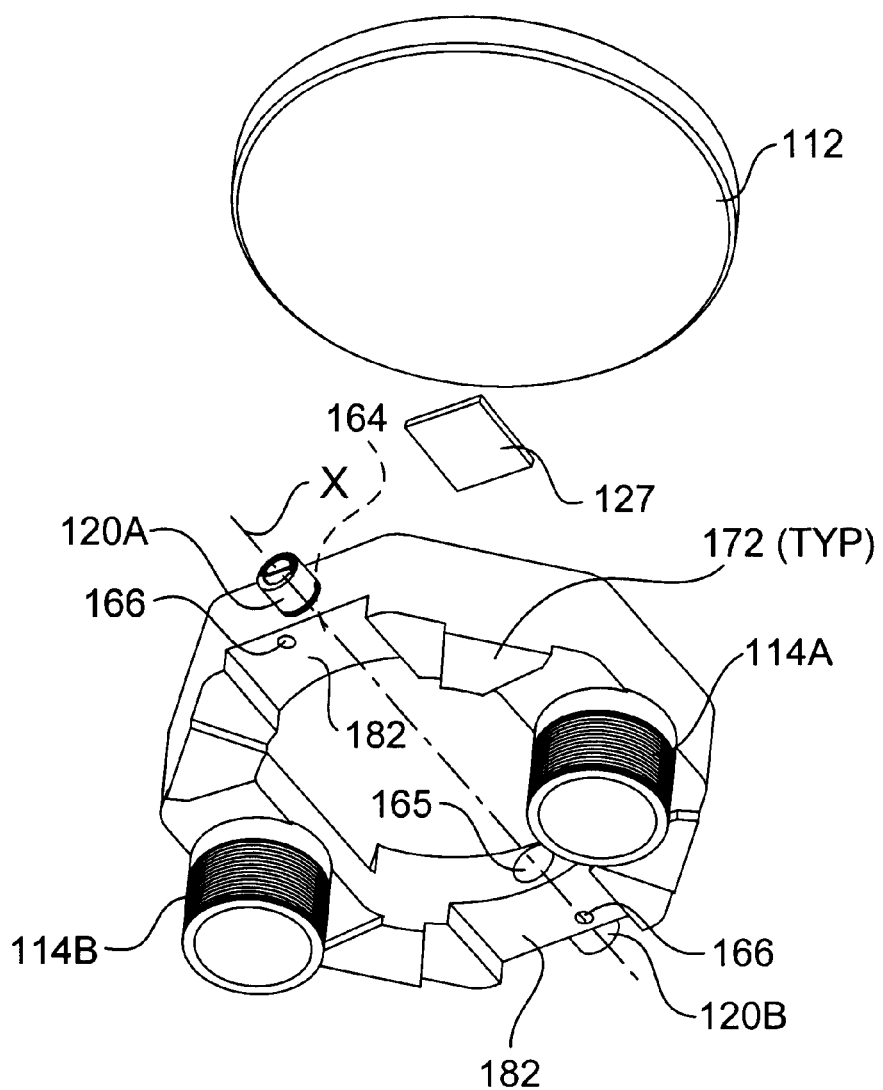
FIG. 8 is a partially explode view of the inner gimbal assembly of FIGS. 7A and 7B.
Figure 9A:
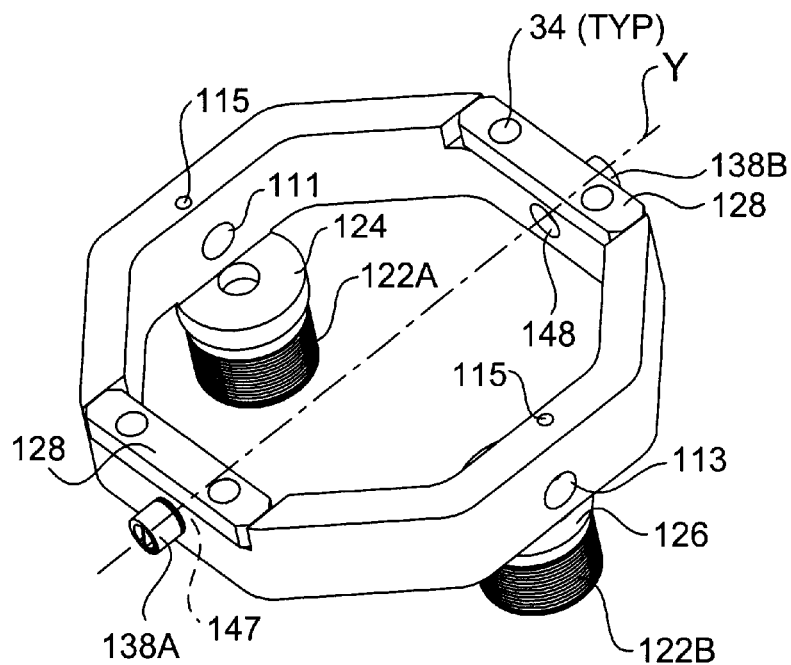
FIGS. 9A and 9B are isometric views of the outer gimbal assembly of FIGS. 7A and 7B.
Figure 9B:
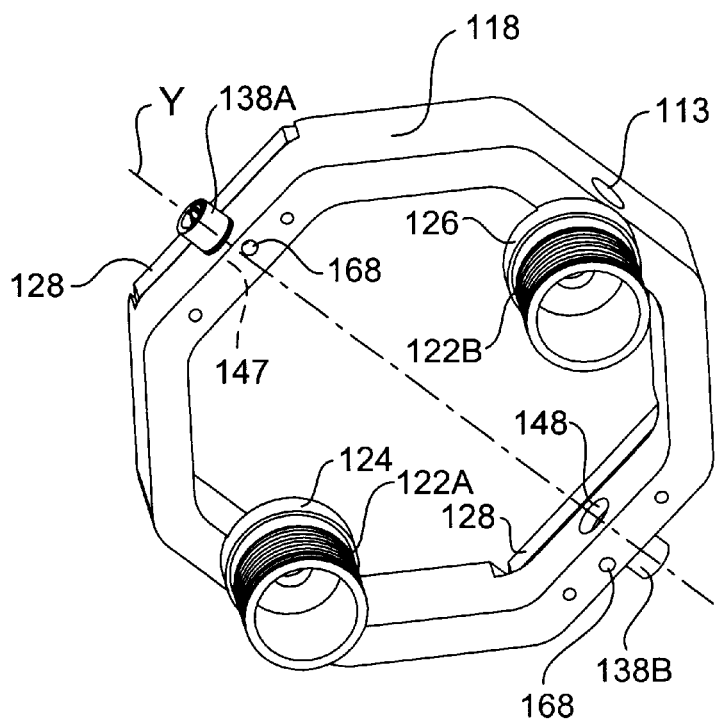

In a manner similar to fast steering mirror 10, the primary subassemblies of fast steering mirror 110 include an inner gimbal assembly 102, an outer gimbal assembly 104, and a base assembly 106. Inner gimbal assembly is pivotally coupled to outer gimbal assembly 104 via a pair of flex-pivots 120A and 120B to create a first pivot axis X. Similarly, outer gimbal assembly 104 is pivotally coupled to base assembly 106 via a pair of flex pivots 138A and 138B to create a second pivot axis Y. Upon assembly, one end of flex pivots 120A and 120B are respectively disposed within collinear holes 111 and 113 defined in outer gimbal frame 118 and secured with a structural adhesive inserted into holes 115, while the other ends of the flex pivots are disposed within respective holes 164 and 165 defined in inner gimbal frame 116 and secured with a structural adhesive inserted into holes 166, as shown in further detail in FIGS. 8, 9A and 9B. Also, upon assembly, one end of flex pivots 138A and 138B are respectively disposed within collinear slots 140 and 142 respectively defined in upright extensions 144 and 146 and secured with a structural adhesive, while the other ends of the flex pivots are disposed within respective holes 147 and 148 defined in outer gimbal frame 118 and secured with a structural adhesive inserted into holes 168.

Inner gimbal assembly 102 includes a pair of voice coils 114A and 114B and outer gimbal assembly 104 includes a pair of voice coils 122A and 122B, each of which is driven by a corresponding voice coil stator 152A, 152B, 152C, and 152D disposed in a respective counterbore 150 defined in a recessed shelf 117 formed in a gimbal support base 148. As explained in further detail below, selective electrical currents are supplied to the windings of the voice coils to generate controllable forces in each voice coil/voice coil stator pair to produce desired rotations of mirror 112 about the X and Y pivot axes using a closed-loop control system. In one embodiment, selected currents are supplied to voice coils 114A and 114B via a flex circuit 119, and are supplied to voice coils 122A and 122B via a flex circuit 121. Upon assembly, one end of each of flex circuits 119 and 121 are connected to a PCB 123 disposed in an underside recess of base member 148 and driven by appropriate drive circuitry, as described in further detail below.

Figure 10A:
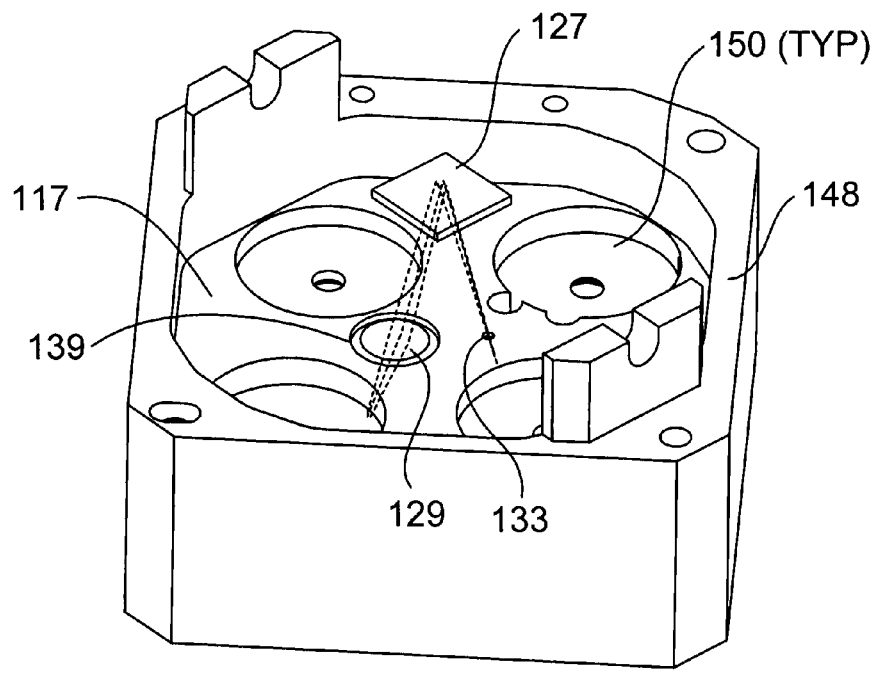
FIG. 10A is an isometric view illustrating the structural components used by a reference position seek mechanism in accordance with the invention.
Figure 10B:
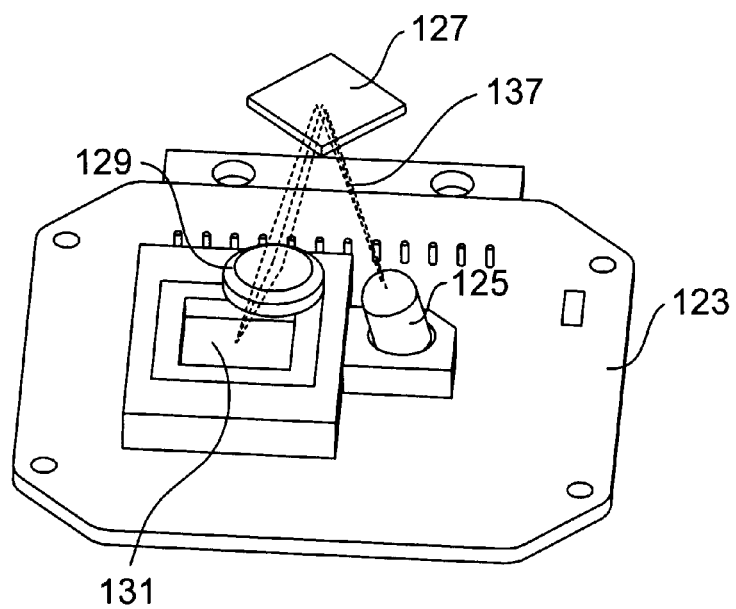
FIG. 10B illustrates the same components as FIG. 10A with the gimbal support base removed.

In one embodiment, fast steering mirror 110 further includes a reference position detection mechanism that enables mirror 112 to be positioned to a known (i.e., reference) position. Details of the structural components of the mechanism are shown in FIGS. 10A and 10B. These components include an emitter 125, a reflector 127, a lens 129 and a detector 131. In response to a drive voltage provided by drive circuitry on PCB 123, the emitter produces light that is directed outward from the top of the emitter. A portion of this light passes through a pinhole aperture 133 defined in shelf 117 to form a light beam 137. Light beam 137 then impinges on reflector 127, which is disposed on the underside of mirror 112 (as shown in FIG. 7B). The light beam is then reflected back toward lens 129, which is mounted within a hole 139 defined in shelf 117. Lens 129 is configured to focus the light beam toward detector 131. As mirror 112 is rotated about its X and Y axes, the position of reflector 127 is similarly rotated, causing the position at which light beam 137 impinges upon detector 131 to move.

Figure 11:
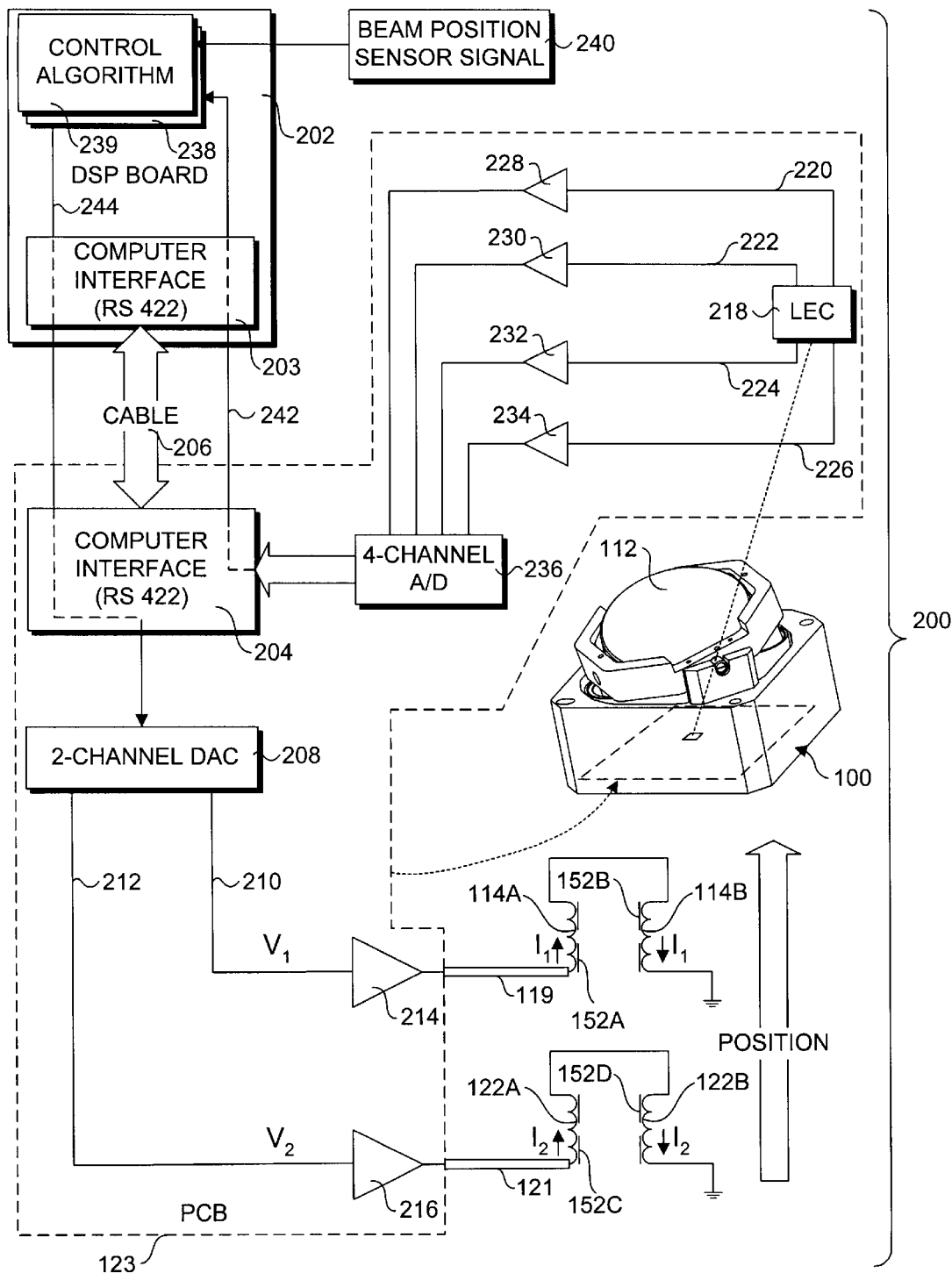
FIG. 11 is a block schematic diagram of a control circuit used for both a reference position seek mode and a beam position control mode in accordance with the invention.

An exemplary control system 200 for controlling the position of mirror 112 in fast steering mirror 110 is shown in FIG. 11. Control system 200 includes a digital signal processor (DSP) board 202 that communications with circuitry on PCB 123 via an RS 422 computer interface comprising respective computer interface components 202 and 204 connected via a cable 206. The circuitry on PCB 123 includes a two-channel digital-to-analog converter (DAC) 208 that includes two output channels 210 and 212 that are respectively connected to amplifiers 214 and 216. The circuitry further includes a reference position circuit comprising a lateral effect cell (LEC) 218 that produces four output signals 220, 222, 224, and 226 that are respectively connected to the input side of instrument amplifiers 228, 230, 232, and 234. The outputs of the instrument amplifiers are connected to the inputs of a four-channel analog-to-digital (A/D) converter 236.

Figure 1:
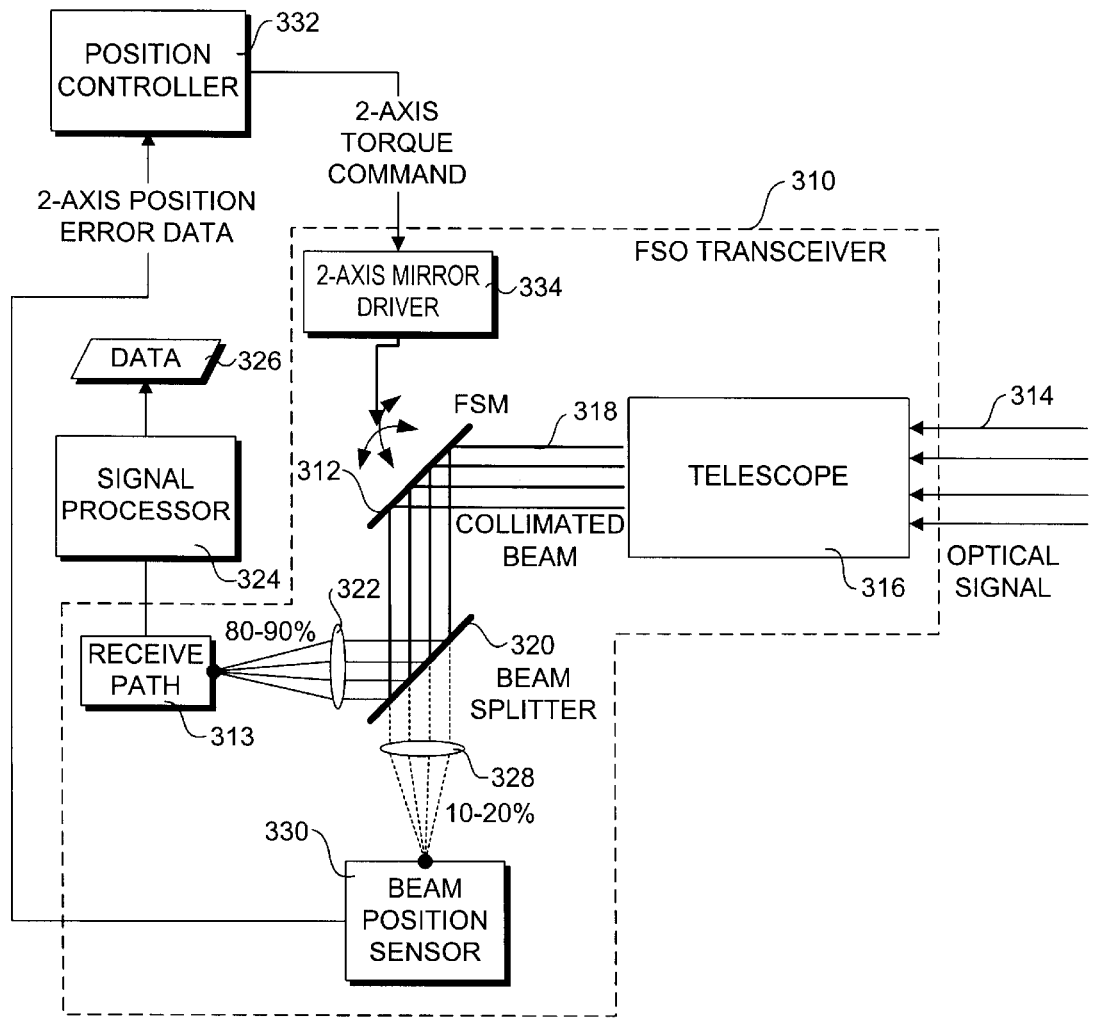
FIG. 1 is a block schematic diagram illustrating the use of a fast steering for positioning a free space optical transceiver.

Control system 200 operates in two modes: a reference position seek mode and a beam position control mode. Each of these modes involves the use of a respective software control algorithm 238 running on DSP board 202. The reference position seek mode positions mirror 112 in a reference position by measuring the position of the mirror using the reference position detection mechanism discussed above with reference to FIGS. 10A and 10B, wherein LEC 218 is used for detector 131. The beam position control mode uses an input signal provided by a beam position sensor 240 to maintain an optimized signal strength of an incoming optical manner in a manner similar to that discussed above with reference to FIG. 1.

In further detail, the reference position seek mode operates as follows. The position of light beam 137 is detected by LEC 218, which outputs signals 220, 222, 224, and 226 based on the detected position. In brief, the LEC produces four continuous current signals that are combined mathematically to produce an X/Y position that is indicative of the position of the mirror. These current signals, which comprise low-level signals, are then amplified by their respective operational amplifiers to produce voltage-level signals that are then fed into 4-channel A/D converter 236, which converts the analog voltage-level signals into corresponding digital signals 242. These digital signals are then passed to control algorithm 238 over cable 206 via the RS 422 computer interface.

As an RS 422 computer interface comprises a full-duplex serial interface, respective digital signals 242 are not sent simultaneously over the RS 422 computer interface, but are rather sent one at a time in a predetermined order. Upon receiving the digital signals, the control algorithm determines a positional error corresponding to a difference between the measured position of mirror 112 and the desired reference position. (In practice, torque commands are transmitted substantially simultaneously with received LEC-current (i.e., position data) over the RS 422 computer interface.) Appropriate X and Y axis tilt command signals 244 are then determined based on the positional error in accordance with well-known closed feedback control loop techniques. For example, a trigonometry-based transformation can be used to determine appropriate tilt command signals corresponding to the positional error. Other control techniques that may be implemented include the use lookup tables that map positional errors to corresponding tilt command signals.

Tilt command (i.e., driver torque) signals 244 are sent back to PCB 123 via the RS 422 computer interface, whereupon they are received as inputs to 2-channel DAC 208. The DAC then converts these signals into analog voltage-level signals $V_1$ and $V_2$. These voltage level signals are then received by amplifiers 214 and 216, which convert them into currents $I_1$ and $I_2$, respectively. Current $I_1$ is then used to drive voice coils 114A and 114B, while current $I_2$ is used to drive voice coils 122A and 122B, wherein the current flows through each pair of voice coils such that a "push-pull" effect is produced. This causes mirror 112 to be rotated about the X and/or Y axis, leading to a new position. The entire foregoing process is repeated on a continuous basis to form a closed-loop control system.

The beam position control mode works in a similar manner, except this time the feedback signals are generated by a beam position sensor that may comprise an LEC, a quad-cell, or one of various other types of light detection sensors that are well known in the art. In this instance, the signals are received by control algorithm 239, which processes the signals to produce an error signal, which is then further processed to produce appropriate tilt command signals.

It is noted that in the foregoing description, a DSP board with an RS-422 computer interface was used to implement the control algorithm. This is not meant to be limiting, as any computer, embedded computer, DSP, or processor may provide the operations provided by the DSP board, and various other types of computer interfaces may be used in addition to an RS-422 computer interface, including other serial interfaces, parallel interfaces, and wireless interfaces.

Figure 12A:
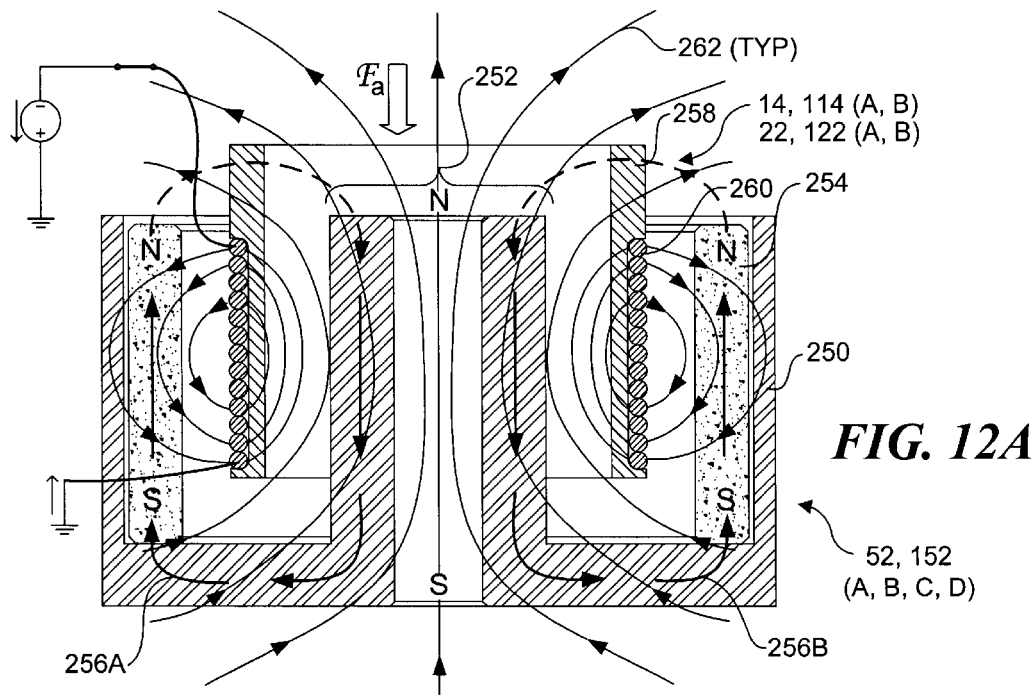
Figure 12B:
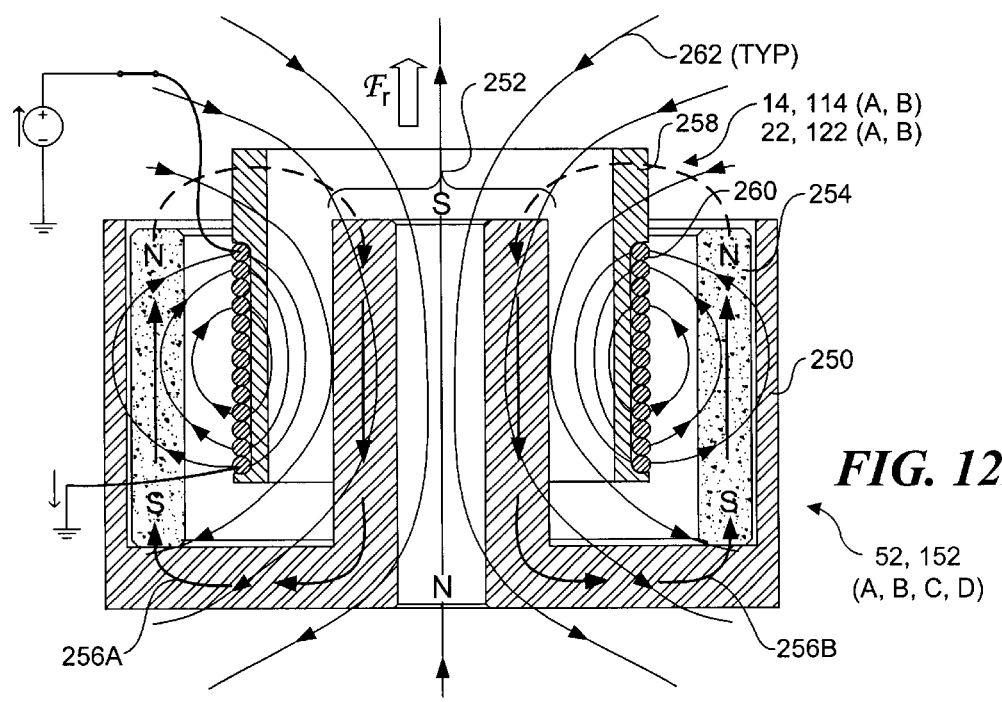

With reference to FIGS. 12A and 12B, the voice coil/voice coil stator pairs generate a push or pull force in response to the input current driven through their respective windings in the following manner. Each voice coil stator 52 and 152 (A, B, C, and D) includes a ferromagnetic "can" 250 that includes an annular post 252 extending upward for a central portion of the base of the can. An annular magnet 254 is disposed adjacent to the inner circumference of the can, as depicted in the cross-sections of FIGS. 12A and 12B. The ferromagnetic can is made of a ferromagnetic material, such as mild steel. Accordingly, when annular magnet 254 is disposed with the ferromagnetic can, magnetic paths 256A and 256B are produced.

Each of voice coils 14, 22, 114, and 122 (A and B) comprise a bobbin 258 would with a plurality of windings or coils 260. In response to being driven by a drive current, coils 260 generate magnetic lines of flux 262 in a manner similar to that illustrated in FIGS. 12A and 12B. The direction of the magnetic lines of flux will depend on the direction the current flows through coils 260. If the direction of magnetic lines of flux 262 and magnetic paths 256A and 256B are in opposite directions, an attractive force Fa is generated that causes a voice coil to be pulled into its corresponding voice coil stator, as illustrated in FIG. 12A. In contrast, when the direction of magnetic lines of flux 262 and magnetic paths 256A and 256B are in the same direction, a repulsive force Fr is generated, causing the voice coil stator to be pushed away from the base of its corresponding voice coils stator, as illustrated in FIG. 12B.

Returning to FIG. 11, note that the coils in respective pairs of voice coils are connected such that the current flows through each of the coils in an opposite direction. As a result, a push-pull effect is created, wherein one voice coil is pulled toward the base of its corresponding voice coil stator, while the other voice coil is pushed away from the base of its corresponding voice coil. The net effect of this is that only a single channel is required for each of pivot Axes X and Y, thereby enabling a two-channel driver to be used to position fast steering mirrors 10 and 110.

Figure 13A:
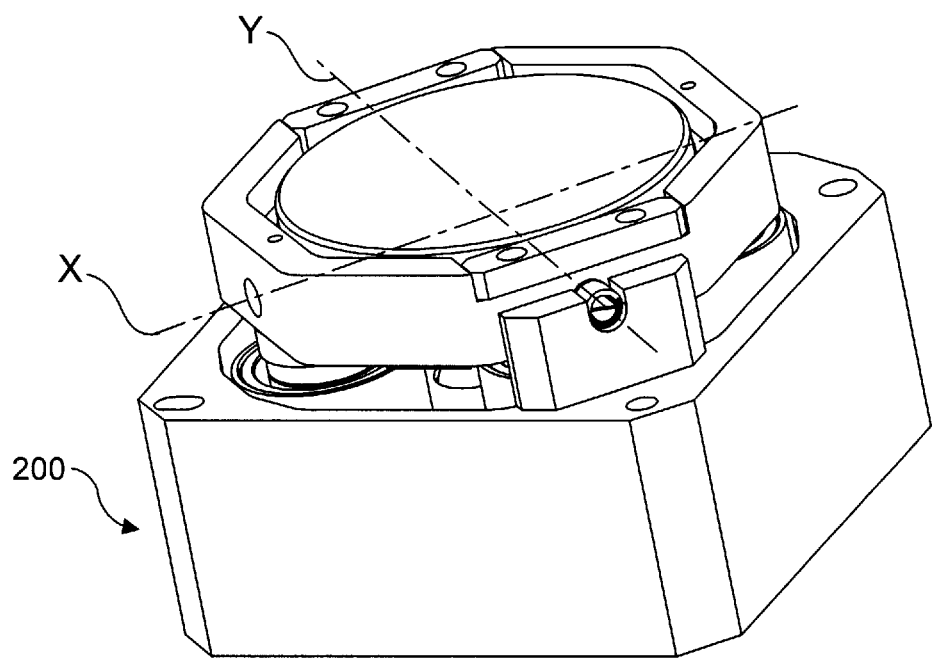
Figure 13B:
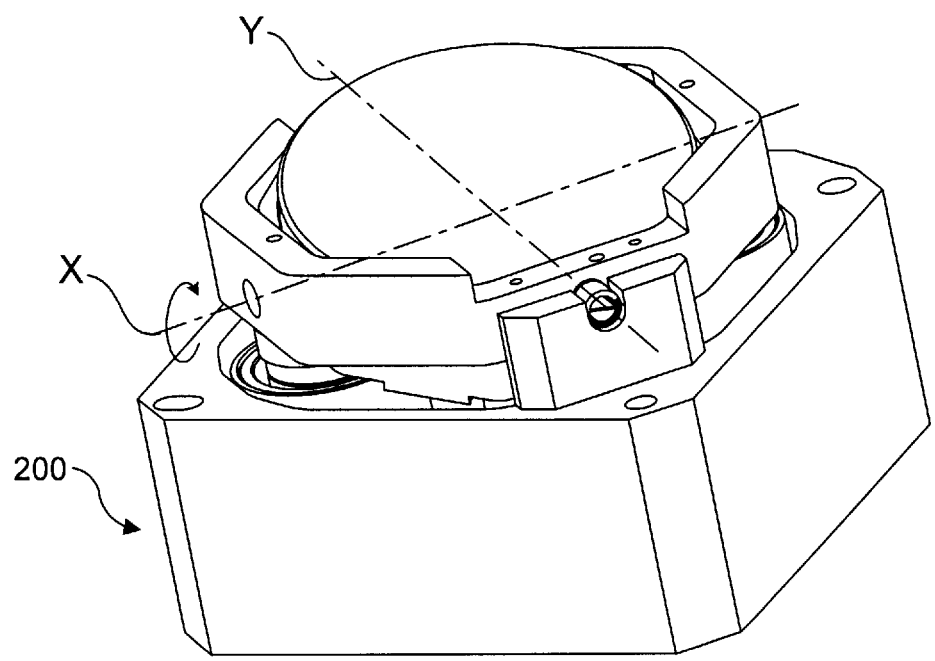
Figure 13C:
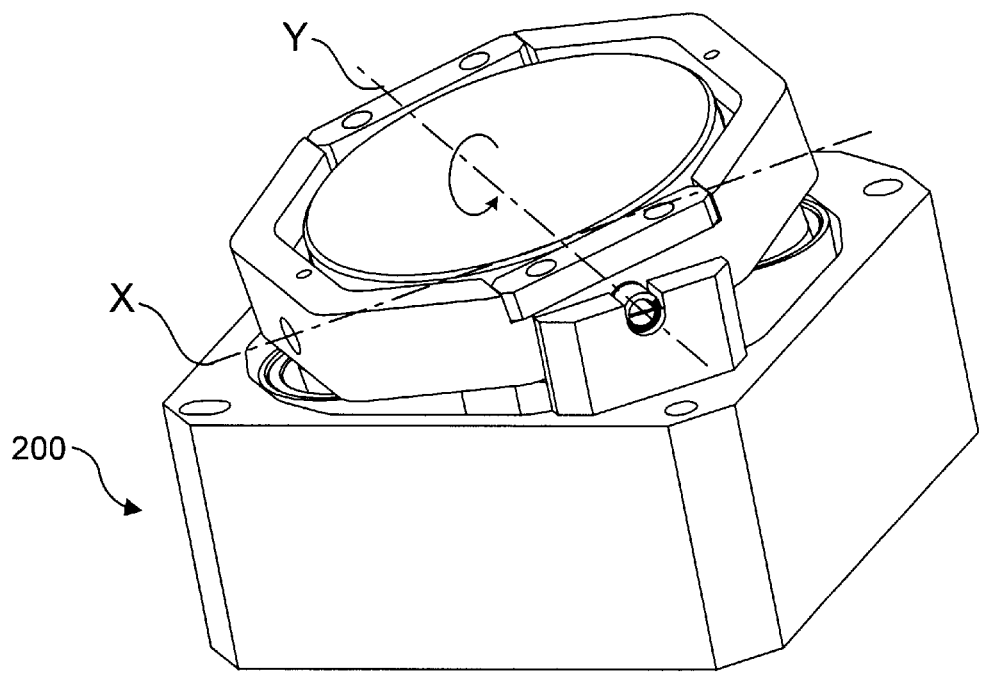
Figure 13D:
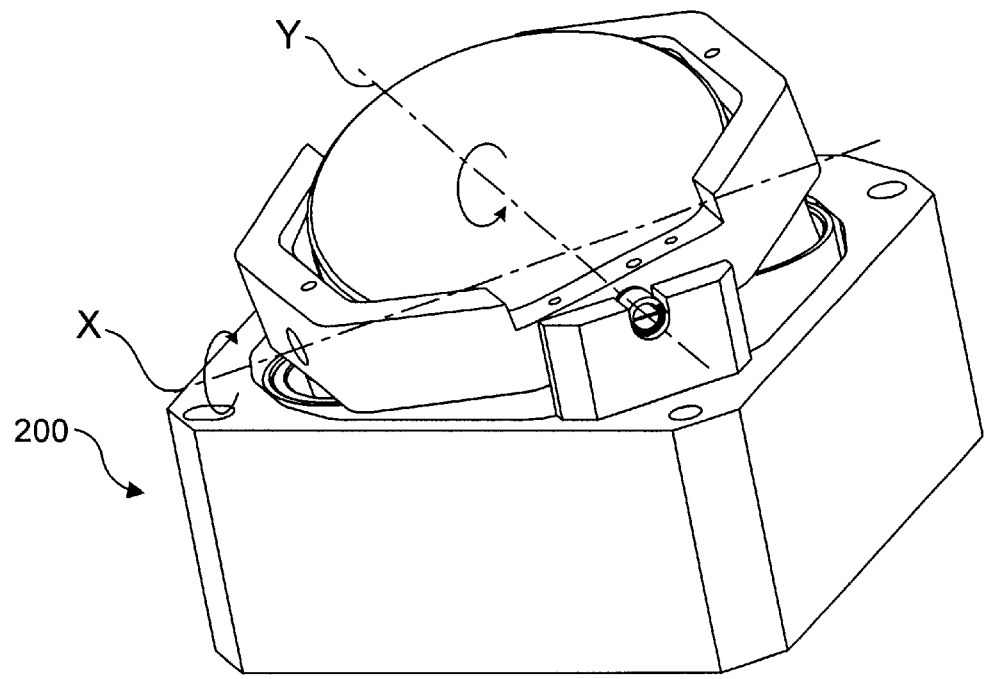

The effects of rotations about the X and Y axis due to corresponding drive currents are shown in FIGS. 13A–D, wherein FIG. 13A shows mirror 112 in a neutral position (e.g. a reference position), FIG. 13B shows mirror 112 rotated about first pivot axis X, FIG. 13C shows mirror 112 rotate about second pivot axis Y, and FIG. 13D shows a complex rotation of mirror 112 about both first and second pivot axes X and Y.

Fast steering mirrors corresponding to the first and second embodiments of the invention presented above have shown significant performance improvements over conventional fast steering mirrors during laboratory testing. These improvements include positioning bandwidths of 1000 Hz, elimination of the optical offset effect caused by non-planar axes of rotation, and increased stiffness, higher efficiency, and lower temperature operations. Unlike conventional designs in which a wound structure is supplied with a current to cause a heavier magnetic stator to move to enable rotation of the mirror, the fast steering mirrors of the invention use a configuration in which lightweight voice coils are moved relative to fixed magnetic stators. This reduces the polar moment of inertia of each of the inner and outer gimbal assemblies, enabling the higher positioning bandwidths to be achieved. Furthermore, since the gimbal assemblies are balanced, the orientation of the fast steering mirror has substantially no effect on its performance.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A fast steering mirror, comprising:
   a base member;
   an outer gimbal, pivotally coupled to the base member;
   an inner gimbal, pivotally coupled to the outer gimbal;
   a mirror fixedly coupled to the inner gimbal;
   a first pair of voice coil drivers comprising a first pair of magnetized stators fixedly coupled to the base member and a first pair of voice coils fixedly coupled to the outer gimbal; and
   a second pair of voice coil drivers comprising a second pair of magnetized stators fixedly coupled to the base member and a second pair of voice coils fixedly coupled to the inner gimbal.

2. The fast steering mirror of claim 1, wherein each of said first and second pair of voice coils comprise a cylindrical shell-shaped bobbin having a plurality of conductive coils wound around an external portion thereof.

3. The fast steering mirror of claim 1, wherein each of said first and second pair of magnetized stators comprise a generally can-shaped member made of a magnetically permeable material in which an annular magnet is disposed.

4. The fast steering mirror of claim 3, wherein the generally can-shaped member further comprises an internal post extending upward from a base portion thereof.

5. The fast steering mirror of claim 1, wherein the outer gimbal includes a pivot axis and is configured such that the outer gimbal and the first pair of voice coils fixedly coupled thereto have a combined center of gravity through which the pivot axis substantially passes.

6. The fast steering mirror of claim 1, wherein the inner gimbal includes a pivot axis and is configured such that the outer gimbal and the second pair of voice coils fixedly coupled thereto have a combined center of gravity through which the pivot axis substantially passes.

7. The fast steering mirror of claim 1, wherein the outer gimbal has a first pivot axis and the inner gimbal has a second pivot axis that is substantially orthogonal to the first pivot axis.

8. The fast steering mirror of claim 7, wherein the mirror is disposed relative to the inner gimbal such that that mirror contain a common point on its surface through which both the first and second pivot axes pass.

9. The fast steering mirror of claim 1, wherein the outer gimbal is pivotally coupled to the base member via a pair of flex pivots.

10. The fast steering mirror of claim 1, wherein the inner gimbal is pivotally coupled to the base member via a pair of flex pivots.

11. The fast steering mirror of claim 1, wherein the base member comprises:
   a base having an upper surface to which the first and second pairs of magnetized stators are fixedly coupled; and
   a frame, having a bottom surface fixed coupled to the upper surface of the base and having a pair of supports extending upward from opposite corners therefrom to which the outer gimbal is pivotally coupled.

12. The fast steering mirror of claim 1, further comprises a driver board containing drive circuitry to provide drive currents to drive the first and second pairs of voice coils and means for electrically connecting each of said drive currents to a respective voice coil.

13. The fast steering mirror of claim 12, wherein each of the first and second pairs of voice coils are configured such that the drive current for one voice coil in each pair of voice coils generates magnetic lines of flux that have a direction that is opposite to the magnetic lines of flux for the other voice coil in the pair.

14. The fast steering mirror of claim 1, further comprising an optical-based feedback and control mechanism to enable the mirror to be positioned in a reference position.

15. A fast steering mirror, comprising:
   a base member;
   an outer gimbal, pivotally coupled to the base member;
   an inner gimbal, pivotally coupled to the outer gimbal;
   a mirror fixedly coupled to the inner gimbal;
   a first pair of voice coil drivers comprising a first pair of magnetized stators fixedly coupled to the base member and a first pair of voice coils fixedly coupled to the outer gimbal; and
   a second pair of voice coil drivers comprising a second pair of magnetized stators fixedly coupled to the base member and a second pair of voice coils fixedly coupled to the inner gimbal;
   a control system configured to receive a position feedback signal and generate drive currents in response thereto to drive each of the voice coils in the first and second pairs of voice coils to control a position of the mirror; and
   means for connecting drive current outputs of the control system to each of the voice coils in the first and second pairs of voice coils.

16. The fast steering mirror of claim 15, wherein the control system includes programmed logic comprising an algorithm that determines a positional error based on the position feedback signal and generates appropriate drive currents to adjust the position of the mirror such that the positional error is reduced.

17. The fast steering mirror of claim 16, wherein the algorithm is processed using a digital signal processor (DSP).

18. The fast steering mirror of claim 16, wherein the DSP is contained on a circuit board that is external to the fast steering mirror, further comprising a computer interface that enables signals to be communicated between the circuit board and the fast steering mirror over a cable connected between the circuit board and the fast steering mirror.

19. The fast steering mirror of claim 15, wherein the control system includes a printed circuit board operatively coupled to the base member that includes amplification circuitry to drive the voice coils.

20. The fast steering mirror of claim 15, further including:
a reflector, coupled to a backside of the mirror;
an emitter to emit light that is directed toward the reflector; and
a light beam position detector; receiving a portion of light reflected from the reflector,
wherein the control system includes a reference positioning mode that uses a feedback signal produced by the light beam position detector in response to the portion of light it receives to position the mirror in a reference position.

21. The fast steering mirror of claim 20, further including a lens disposed between the reflector and the light position detector to focus light reflected by the reflector onto the light beam position detector.

22. The fast steering mirror of claim 20, further including a pin-hole aperture disposed between the emitter and the reflector to direct a portion of the light emitted by the emitter toward the reflector.

23. The fast steering mirror of claim 15, wherein the means for connecting the drive current outputs of the control system to each of the voice coils comprises flex circuits.

24. The fast steering mirror of claim 15, wherein each of the first and second pairs of voice coils includes windings that are connected in series such that a current flowing through the windings causes one of the voice coils in a pair to generate a push force away from its corresponding magnetic stator while the other voice coil in the pair generated a pull force toward it corresponding magnetic stator.

25. The fast steering mirror of claim 15, wherein each of the voice coils in said first and second pair of voice coils comprises a cylindrical shell-shaped bobbin having a plurality of conductive coils wound around an external portion thereof.

26. The fast steering mirror of claim 15, wherein each of the magnetized stators in said first and second pair of magnetized stators comprises a generally can-shaped member made of a magnetically permeable material in which an annular magnet is disposed.

27. The fast steering mirror of claim 25, wherein the generally can-shaped member further comprises an internal post extending upward from a base portion thereof.

* * * * *